Figure 1:
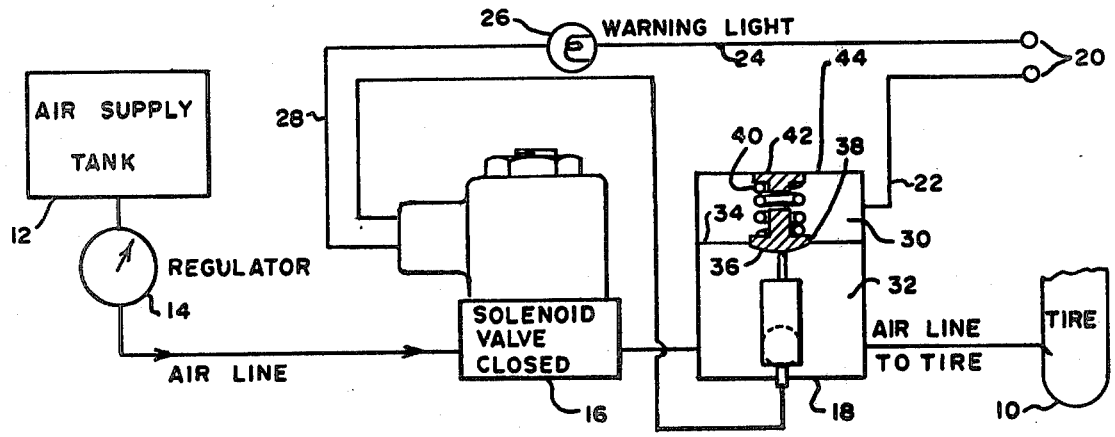

United States Patent [19]

Dudar

[11] 4,212,334

[45] Jul. 15, 1980

[54] TIRE INFLATING UNIT

[76] Inventor: Walter H. Dudar, 1227 Levee St., Dallas, Tex. 75207

[21] Appl. No.: 961,135

[22] Filed: Nov. 16, 1978

[51] Int. Cl.² .................................................. B65B 3/26
[52] U.S. Cl. .................................... 141/197; 137/224; 137/487.5
[58] Field of Search ............ 137/223, 224, 225, 487.5; 141/38, 39, 46, 95, 197; 340/58; 152/415

[56] References Cited

U.S. PATENT DOCUMENTS 1,655,003  1/1928  Woodford .................... 137/487.5 X Primary Examiner—Frederick R. Schmidt
Attorney, Agent, or Firm—John D. Pope, III

[57] ABSTRACT

A unit for inflating a vehicle tire is provided which functions to transmit air only if the tire contains at least a predetermined pressure. A signal is also provided which will function either to notify the user that air is being transmitted, or in the alternative, that air is not transmitted because a predetermined pressure was not present in the tire.

5 Claims, 2 Drawing Figures

TIRE INFLATING UNIT

This invention relates to units which serve to monitor the inflation of a vehicle tire, particularly a truck tire. The invention is especially valuable for use with multi wheeled vehicles.

Every truck owner is well aware that proper inflation of tires on trucks is not only an important factor in their operation but, if properly performed, decreases the cost of maintenance and repair. In addition properly inflated tires have been proven to reduce fuel consumption up to ten percent and contributes substantially to the vehicle safety. While these factors are of great importance they are frequently neglected by maintenance personnel and drivers who operate a commercial vehicle, such as a truck, because of the time and trouble necessary in maintaining proper air pressure in the tires.

The structure of my U.S. Pat. No. 3,913,632 is a great assistance in overcoming the reluctance of truck operators to adequately maintain their vehicles but the small amount of effort required by that invention is sometimes neglected. This sometimes occurs because ignoring warnings of needed repairs is the avenue of least resistance.

Among the objects of the present invention are the provision of a unit designed to be added to standard air pressure outlets to function between the outlet and the inlet to the vehicle tire; the provision of such units which function to prevent the inadvertent addition of air to a tire having a pressure below a predetermined limit; the provision of such a unit which will notify the user of the admission or non-admission of air to the vehicle tire and the provision of such a unit which is inexpensive to manufacture and effective in operation. Other objects and features will be in part apparent and in part pointed out hereinafter.

The invention accordingly comprises the constructions hereinafter described, the scope of the invention being indicated in the following claims.

In the accompanying drawings, in which one of the various embodiments of the invention is illustrated.

Figure 2:
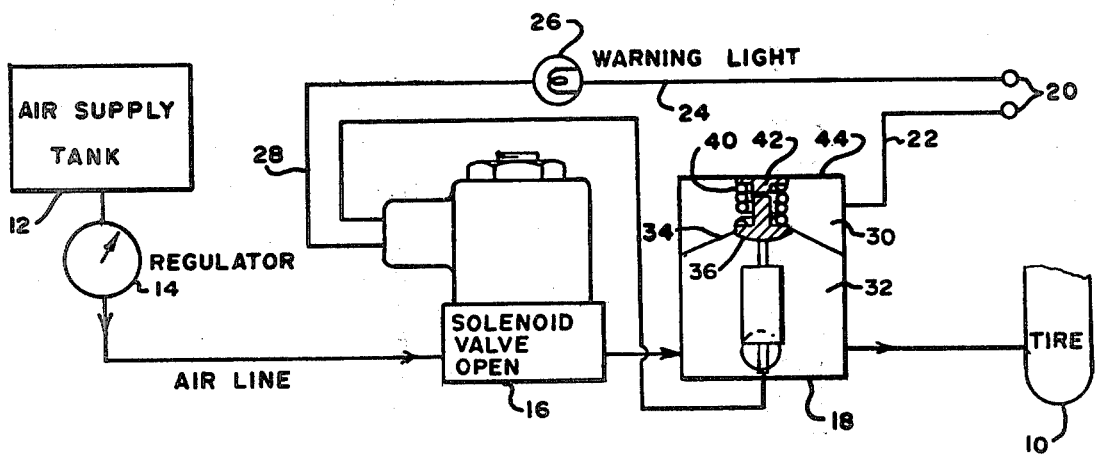

FIG. 1 is a diagram of a tire inflating unit of the present invention positioned to bar entry of air to the tire; and FIG. 2 is a view similar to FIG. 1, but in which the unit responding to a predetermined pressure in the tire is admitting air to the tire through the unit and simultaneously signalling this fact.

Corresponding reference characters indicate corresponding parts throughout the several views of the drawings.

As shown in FIG. 1 a vehicle tire 10 is connected to a source of compressed air 12 through a regulator 14, an air solenoid valve 16, and a control unit 18. These components are connected by appropriate air lines and unit 18 is connected to a power source 20 by an electrical conduit 22. Power source 20 is electrically connected by a conduit 24 to a warning signal 26, which in turn is electrically connected by 28 to solenoid 16.

Control regulator 14 is of any desired type which is adjustable to admit air from air source 12 only until the system reaches an air pressure of a desired preset amount, such as 90 pounds. Air solenoid 16 is of a customary type and is in a normally closed position until actuated by an electrical impulse from the vehicle power source through line 24, warning signal 26, and line 28.

Control 18 may be of the type disclosed in my U.S. Pat No. 3,380,021 which describes a unit suitable for indicating tire pressure and wheel bearing temperature. It may be simplified to indicate only air pressure and in this form includes a a double chamber consisting of an upper portion 30 and a lower portion 32. These are separated by a diaphram 34 in which is located a support 36, forming a barrier between the two chambers.

Diaphragm 34 carries an electrical contact 38 and is biased by a spring 40. The biasing force of spring 40 is adjusted by control knob 42.

Control 18 is preset by adjusting control knob 42 so that the biasing action of spring 40 corresponds to a predetermined minimum pressure below which it can be assumed that the tire is faulty and should be removed for inspection and possible repair. When the unit of the present invention is connected to a vehicle tire, the air passage between the source of compressed air and the tire is closed by solenoid 16. If, at this point, the pressure in the tire is above the predetermined value for which control knob 42 is set, diaphragm 36 will respond to the pressure in the tire and move electrical control 38 to the top of the unit 44, closing a circuit through power source 20 to solenoid 16, thereby opening the solenoid and permitting the passage of air from air source 12 to tire 10.

If, however, the pressure in tire 10 is below the predetermined pressure, the bias of spring 40 is not overcome, the circuit is not closed to solenoid 16, and no air is transferred from air source 12 to tire 10.

Signal 26 can be connected so that it will be actuated when current passes to air solenoid 16, in which case, it will be actuated when the tire is being inflated by air passing from source 12 to tire 10. Unless it is actuated the truck operator is notified to remove the tire and determine why the pressure therein is low. Since the warning signal and the air source are located in a service area, the failure of truck operator to heed the message of signal 26 can be easily noted by others, and is, therefore, less likely to be disregarded.

The position of the parts when the pressure in the tire is above the predetermined limit and therefore the tire is being inflated from air source 12 is shown in FIG. 2. It will be noted that in this instance, diaphragm 36 has moved up away from barrier 34, closing the circuit to power source 20, and thereby to solenoid 16. In this instance, air passes from source 12 to tire 10 until the limit set on regulator 14 is reached, at which time regulator 14 closes in a known manner to shut off the passage of air.

In lieu of an electrically controlled solenoid valve 16 a manually controlled valve can be substituted. The valve is then operated manually in response to the information provided by warning signal 26.

In view of the above, it will be seen that the several objects of the invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for inflating a vehicle tire comprising a valve adapted for movement from a normally closed position to an open position and having a valve inlet for connection to a source of compressed air and a valve outlet; control means adapted to block movement of said valve to the open condition unless the pressure in the tire exceeds a preset level, said control means including a control inlet for connection to the tire to be inflated, movable contact means responsive to pressure admitted by said control inlet and movable from a normal position to a preset limit position, adjustable biasing means adapted for biasing said movable contact means toward its normal position, and circuit means opened and closed by said movable contact means, said circuit means adapted for controlling movement of said valve to its open position when said circuit means is closed, and for moving said valve to its closed condition when said circuit means is open; and, air conduit means connecting said valve outlet to the tire to be inflated, whereby when the control inlet is connected to a vehicle tire to be inflated, if the pressure in the tire is above said preset level said contact means will move against said adjustable bias means to its preset limit position to close said circuit means thereby moving said valve to the open position permitting the passage of air from said source through said air conduit means into the tire 2. A device according to claim 1 in which the pressure responsive movable contact means includes biasing spring means.

3. A device according to claim 2 in which the valve is a solenoid.

4. A device according to claim 3 in which the control means operates the solenoid in response to one limit position of the pressure responsive movable contact means.

5. A device according to claim 1 in which the valve control means is electrical control means.

* * * * *